Patented July 28, 1931 1,816,800

UNITED STATES PATENT OFFICE

CORNELIS BERNARDUS VAN NIEL, OF DELFT, NETHERLANDS, ASSIGNOR, BY MESNE ASSIGNMENTS, TO NAAMLOOZE VENNOOTSCHAP. INTERNATIONALE OCTROOI MAATSCHAPPIJ "OCTROPA", OF ROTTERDAM, NETHERLANDS

PROCESS OF MANUFACTURING AROMATIC AND DURABLE BUTTER

No Drawing. Application filed November 15, 1928, Serial No. 319,737, and in the Netherlands November 19, 1927.

In recent literature concerning the manufacture of butter, there is a general agreement that the keeping quality and the aroma of butter are two characteristics which are to a certain extent incompatible.

Highly aromatic butter as obtained in the usual manner is liable to deterioration by micro-organisms, which is promoted by the presence of milk sugar, lactic acid and lactates, nitrogenous substances, etc., in the ready product. As a result all kinds of biological processes may occur in the butter as it is impossible to exclude infections with different micro-organisms during the manufacture. In order to obtain a durable butter it has already been proposed to eliminate the above mentioned milk constituents by thoroughly washing the butter.

The butter obtained in this way, however, has the disadvantage that it has lost its aroma for the greater part, since the substances causing the aroma are fairly soluble in water and are consequently lost during the washing process. It has been found that it is possible to produce a highly aromatic and yet durable butter by applying the invention which consists in first thoroughly washing the butter and subsequently adding thereto the characteristic substances, imparting to the butter the desired aroma, free from the milk constituents which promote the rapid deterioration.

I have found that this result may be obtained by adding to the butter which has been washed in the above described way diacetyl and acetylmethylcarbinol or compounds allied thereto, particularly homologues, or several of these substances. Accordingly the valuable butter aroma mainly consisting in the above mentioned substances, which are removed with the washing water in the progressive washing of the butter with a view to obtain a durable product, may be reintroduced into the butter after the washing has been completed.

The aromatic constituents may be isolated from the washing water or may be obtained in a biological or purely chemical way; they may be added as such or in solution and with or without addition of salt, dyestuff or other permissible addition.

By the process according to the invention a durable highly aromatic butter is obtained, so that the process is of the greatest importance in the manufacture of export butter.

It is difficult to completely exclude the presence of various micro-organisms in the manufacture of the butter; consequently it is possible that the substances which provide the aroma may be wholly or in part decomposed by such micro-organisms. The durability of the butter would not be endangered thereby but the aroma might be gradually weakened. In order to avoid this, the precautions necessary in making butter for excluding undesired micro-organisms have to be applied with special care; for example, the washing process may be conducted with germ-free water, e. g. by previously heating the water to a high temperature or by filtering same through a germ filter; or the amount of the aromatic substances added to the butter may be somewhat increased so that the aroma may be retained for a longer period.

The following example illustrates the invention:

500 litres of pasteurized centrifuge cream containing 22 per cent of fat are cooled in a closed cooler to 21° C. and brought into a well cleaned souring vessel, in which the souring is effected by the addition of 15 litres of a 16 hours old pure culture of Streptococcus paracitrovorus and 10 litres of a 16 hours old pure culture of Streptococcus lactis.

When in the course of 18–20 hours the degree of acidity of the cream has risen to about 15° Soxhlet-Henkel (Milchwirtschaftliches Zentralblatt 1907, Vol. 3, S. 340) the contents of the vessel are transferred to a thoroughly clean butter churn, infection being prevented as much as possible.

The churning and washing of the butter are carried out in the usual manner, but well water is used for the washing, if necessary after filtration through a germ filter. The washing is continued with periodically renewed germ-free water until the water no longer shows an acid reaction to litimus tincture or to phenol red-indicator.

During the subsequent kneading 2 grams of diacetyl are added corresponding approximately with the quantity of aromatic material which has been removed from the butter.

The butter treated in the manner as described above is substantially free from milk constituents promoting the deterioration and contains an adequate amount of diacetyl, acetylmethylcarbinol or allied substances or several of these together.

I claim:

1. A process of manufacturing of highly aromatic and durable butter with natural flavor, consisting in washing the butter in order to remove therefrom the substances which affect the durability of the butter and subsequently reintroducing diacetyl into the butter.

2. A process of manufacturing a durable butter with natural aroma, consisting in washing the butter in order to remove therefrom the substances which affect the durability of the butter and subsequently reintroducing into said butter diketones which are homologues of diacetyl.

3. A process of manufacturing a durable butter with natural aroma, consisting in washing the butter in order to remove therefrom the substances which affect the durability of the butter and subsequently reintroducing acetylmethylcarbinol.

4. A process of manufacturing a durable butter with natural aroma, consisting in washing the butter in order to remove therefrom the substances which affect the durability of the butter and subsequently reintroducing hydroxyketones which are homologues of acetylmethylcarbinol.

5. A process of manufacturing a durable butter with natural aroma, consisting in washing the butter in order to remove therefrom the substances which affect the durability of the butter and subsequently introducing into the butter material selected from the group consisting of diacetyl and acetylmethylcarbinol and substances homologous thereto.

6. A highly aromatic and durable butter containing diacetyl in a proportion of more than one part of diacetyl to five parts of acetylmethylcarbinol.

7. A durable butter possessing natural aroma, consisting of thoroughly washed and cleaned butter with the addition of material selected from the group containing diacetyl and acetylmethylcarbinol and substances homologous thereto.

8. A butter as described in claim 7, said additional substances being of greater proportion than in natural butter.

In testimony whereof I affix my signature.

Prof. Dr. CORNELIS BERNARDUS van NIEL.